(12) United States Patent
Dupont et al.

(10) Patent No.: US 12,479,546 B2
(45) Date of Patent: Nov. 25, 2025

(54) MAINTENANCE MANAGEMENT METHOD FOR A SHIP

(71) Applicant: Gaztransport Et Technigaz, Saint Remy les Chevreuse (FR)

(72) Inventors: Nicolas Dupont, Saint Remy les Chevreuse (FR); Florent Ouvrard, Saint Remy les Chevreuse (FR)

(73) Assignee: Gaztransport Et Technigaz, Saint Remy les Chevreuse (FR)

( * ) Notice: Subject to any disclaimer, the term of this patent is extended or adjusted under 35 U.S.C. 154(b) by 684 days.

(21) Appl. No.: 17/292,275

(22) PCT Filed: Nov. 12, 2019

(86) PCT No.: PCT/FR2019/052680
§ 371 (c)(1),
(2) Date: Oct. 12, 2021

(87) PCT Pub. No.: WO2020/099772
PCT Pub. Date: May 22, 2020

(65) Prior Publication Data
US 2022/0033040 A1    Feb. 3, 2022

(30) Foreign Application Priority Data
Nov. 15, 2018    (FR) ...................................... 1860552

(51) Int. Cl.
| | | |
|---|---|---|
| *B63B 79/40* | (2020.01) | |
| *B63B 25/16* | (2006.01) | |
| *B63B 57/00* | (2006.01) | |
| *B63B 71/00* | (2020.01) | |
| *B63B 79/20* | (2020.01) | |
| *B63B 79/30* | (2020.01) | |
| *F17C 1/00* | (2006.01) | |

(Continued)

(52) U.S. Cl.
CPC .............. *B63B 79/40* (2020.01); *B63B 25/16* (2013.01); *B63B 57/00* (2013.01); *B63B 71/00* (2020.01);

(Continued)

(58) Field of Classification Search
CPC ......... G01F 23/00; B63B 79/40; B63B 25/16; B63B 57/00; B63B 71/00; B63B 79/20;
(Continued)

(56) References Cited

U.S. PATENT DOCUMENTS

| | | |
|---|---|---|
| 8,643,509 B1 | 2/2014 | Chen et al. |
| 8,770,125 B2 | 7/2014 | Guerrier |

(Continued)

FOREIGN PATENT DOCUMENTS

| | | |
|---|---|---|
| CN | 102421664 A | 4/2012 |
| EP | 2 772 678 A1 | 9/2014 |

(Continued)

OTHER PUBLICATIONS

First Notice of Review Observations dated Oct. 28, 2023 issued in CN 201980075550.0.

(Continued)

*Primary Examiner* — Stephen D Meier
*Assistant Examiner* — Leo T Hinze
(74) *Attorney, Agent, or Firm* — Blank Rome LLP

(57) ABSTRACT

The invention relates to a method for managing maintenance for a ship comprising a sealed and thermally insulating tank for transporting liquefied gas. The method comprises the steps consisting in determining 310 a current filling level of the tank, determining 320 a current state of movement of the ship, determining 330 a current sloshing index IBi from the current filling level of the tank and the current state of movement of the ship, taking into account the position and the geometry of the tank, integrating 340 the determined current sloshing index IBi into a wear index IUi that takes into account a history of the sloshing indices. The wear index is then compared to a threshold in order to indicate if the tank needs to be inspected, depending on the result of the comparison.

10 Claims, 3 Drawing Sheets

(51) Int. Cl.
*G01F 23/00* (2022.01)
*G05B 23/02* (2006.01)

(52) U.S. Cl.
CPC .............. *B63B 79/20* (2020.01); *B63B 79/30* (2020.01); *F17C 1/002* (2013.01); *G01F 23/00* (2013.01); *G05B 23/0283* (2013.01); *F17C 2260/015* (2013.01); *F17C 2260/016* (2013.01)

(58) Field of Classification Search
CPC ......... B63B 79/30; B63B 79/00; B63B 81/00; F17C 1/002; F17C 2260/015; F17C 2260/016; F17C 2270/0105; G05B 23/0283
See application file for complete search history.

(56) References Cited

U.S. PATENT DOCUMENTS

2005/0107963 A1    5/2005  Campbell
2015/0020604 A1*  1/2015  Lee ....................... G01P 15/093
                                                               73/800
2016/0229492 A1    8/2016  Lee
2017/0183062 A1    6/2017  Lee

FOREIGN PATENT DOCUMENTS

KR            101162469 B1    7/2012
KR      10-2015-0044546    4/2015
WO        2018115741 A1    6/2018

OTHER PUBLICATIONS

Office Action issued in corresponding Korean Application No. 10-2021-7014486 dated May 16, 2024.

Michihisa Watanabe et al., "Structural Design and Construction Method for "Apple-Shaped Liquefied Natural Gas Cargo Tank" for LNG Carriers", Mitsubishi Heavy Industries Technical Review vol. 53, No. 2 (Jun. 2016).

* cited by examiner

[Fig. 1]
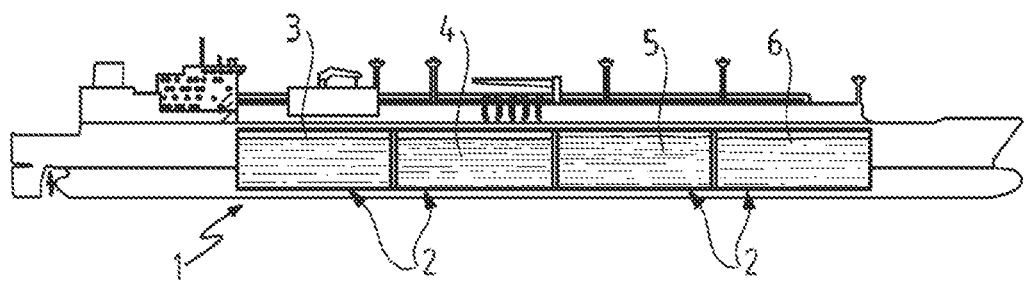
[Fig. 2]
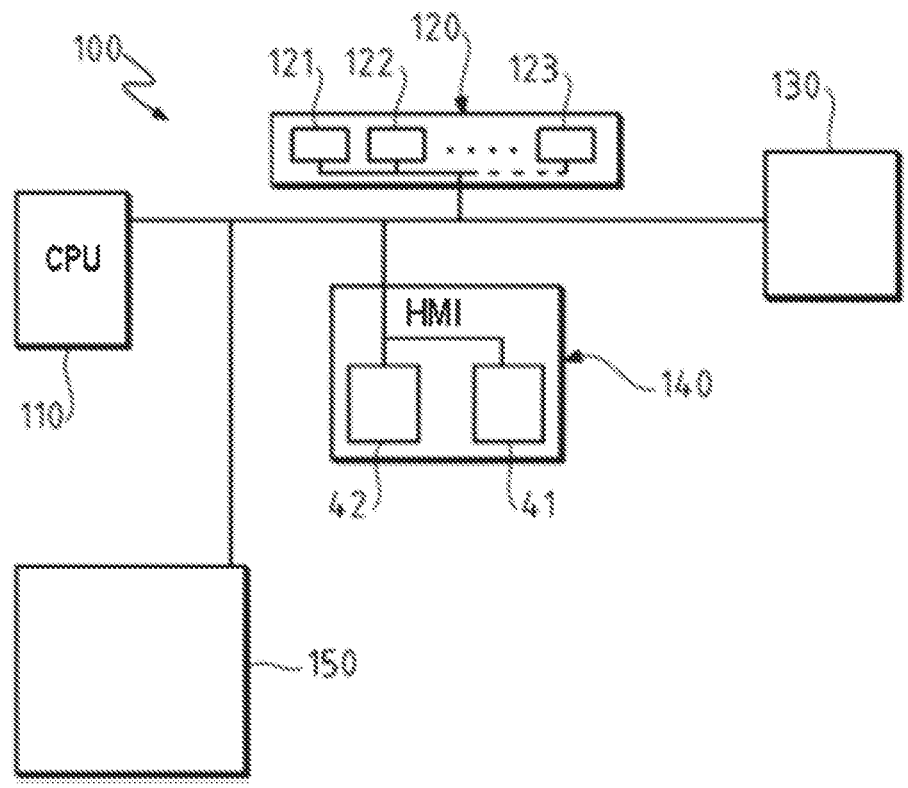

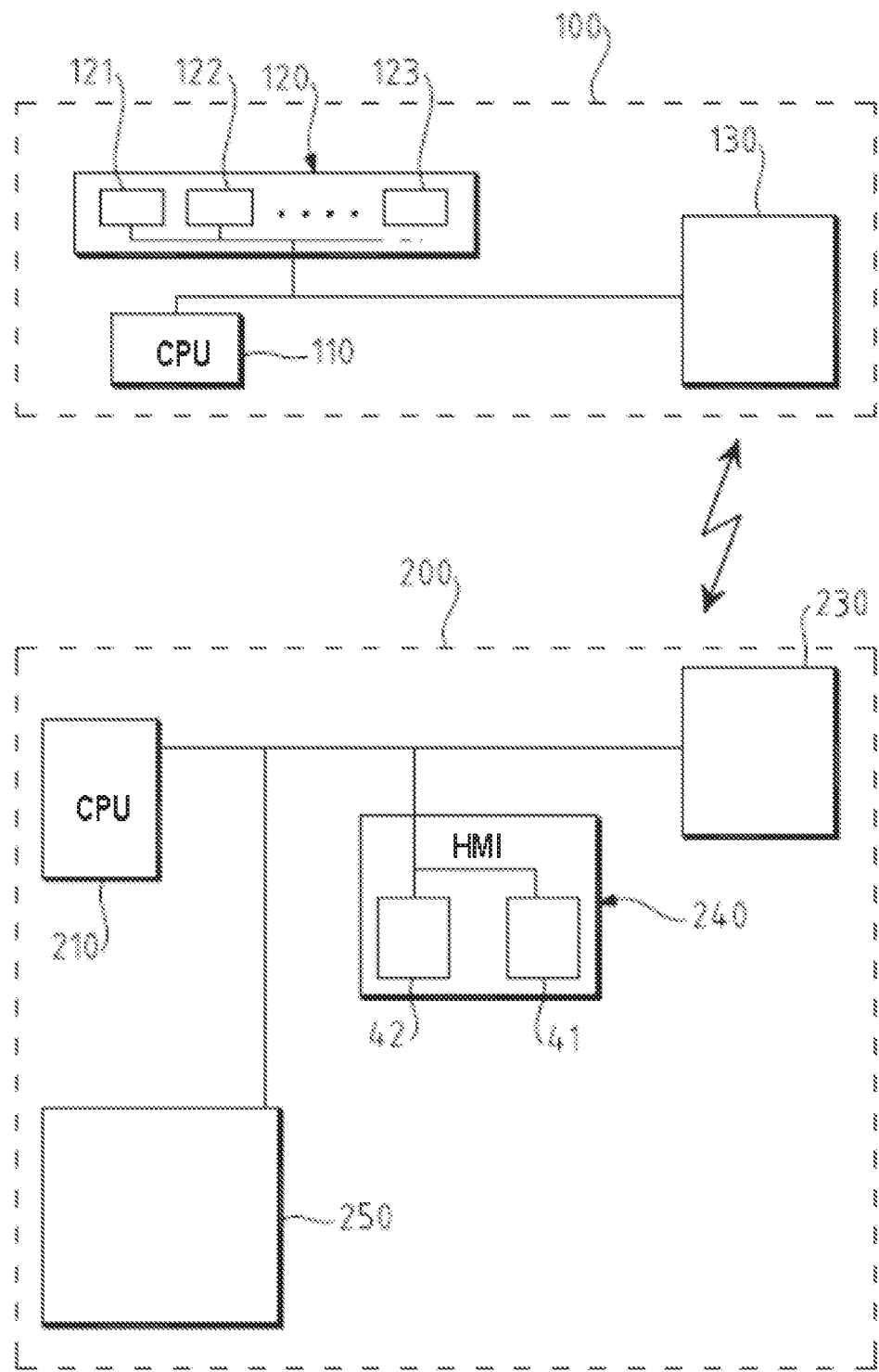
[Fig. 3]

[Fig. 4]
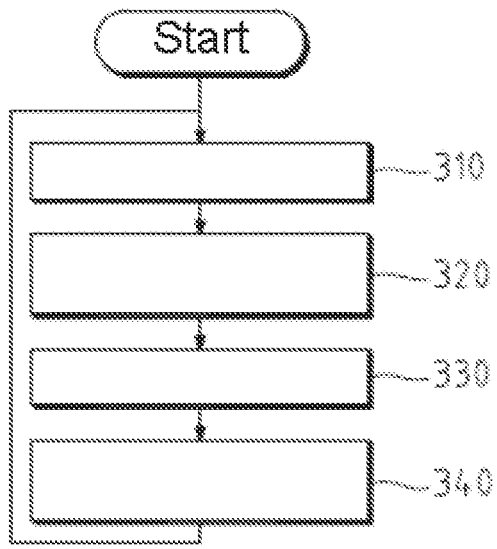
[Fig. 5]
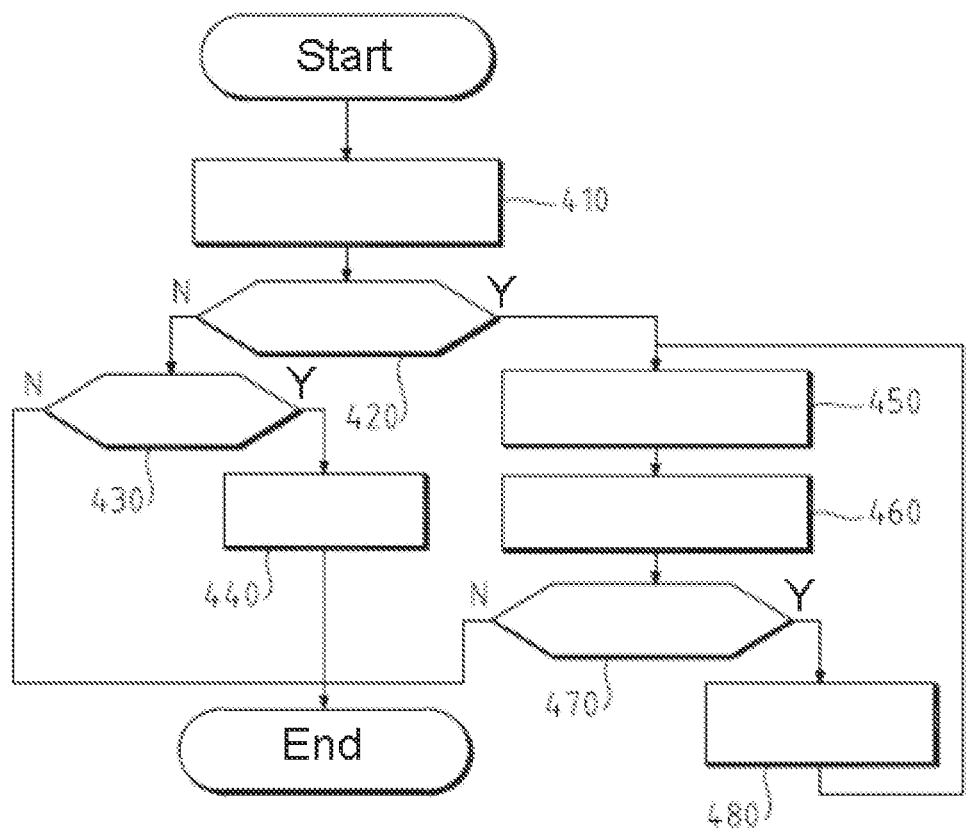

MAINTENANCE MANAGEMENT METHOD FOR A SHIP

This application is a U.S. national stage application based on International Application No. PCT/FR2019/052680 filed Nov. 12, 2019, which claims priority to French Application No. 1860552, filed Nov. 15, 2018, both of which are herein incorporated by reference in their entirety.

TECHNICAL FIELD

The invention relates to a maintenance management method for a ship including one or more tanks. The invention relates more particularly to the inspection and to the maintenance of sealed and thermally insulating tanks for transporting liquefied gas. In the present document the term "ship" designates a means of transporting liquefied gas between two points of the globe or a floating unit for processing and/or storing one or more liquefied gases.

TECHNOLOGICAL BACKGROUND

Sealed and thermally insulating tanks are routinely used for storing and/or transporting liquefied gas at low temperature, such as tanks for transporting liquefied petroleum gas (LPG) at a temperature for example between −50° C. and 0° C. inclusive or for transporting liquefied natural gas (LNG) at approximately −162° C. at atmospheric pressure. These tanks may be intended to transport liquefied gas and/or to receive liquefied gas serving as fuel for the propulsion of the floating structure. Numerous liquefied gases can therefore be envisaged, in particular methane, ethane, propane, butane or ethylene.

The ship tanks may be single-seal or double-seal membrane tanks that allow transport at atmospheric pressure. The sealing membranes are generally made of thin sheet stainless steel or Invar. A membrane is generally in direct contact with the liquefied gas.

During its transportation the liquid contained in a tank is submitted to various movements. In particular, the movements of a ship at sea, for example because of the effect of climatic conditions such as the state of the sea or the wind, lead to agitation of the liquid in the tank. The agitation of the liquid, generally designated "sloshing" (or ballottement in French), generates stresses in the walls of the tank that may compromise the integrity of the tank.

These sloshing phenomena appear on ships transporting natural gas, hereinafter LNG, or methane tankers and on anchored storage ships known as FPSO (Floating Production Storage & Offloading) units such as for example an extraction platform and a natural gas liquefaction plant, usually called FLNG (Floating Liquefied Natural Gas) units or a Floating Storage and Regaseification Unit (FSRU), that is to say more generally a floating production, storage and export support. The sloshing phenomena occur as much under rough sea conditions as under virtually still sea conditions, as soon as the liquefied gas cargo resonates with the excitation created by swell, even of low amplitude, to which the ship is subjected. In these situations of resonance, the sloshing may become extremely violent, in particular breaking on the vertical walls or in the corners, thus risking damage to the system of confinement of the liquefied gas or the insulation system present just behind said confinement system.

Now, the integrity of the tank is particularly important in the context of a liquefied gas tank, for example an LNG tank, because of the inflammable or explosive nature of the liquid transported and the risk of cold spots on the steel hull of the floating unit in the event of a leak.

U.S. Pat. No. 8,643,509 discloses a method of reducing the risk linked to the sloshing of a liquefied gas cargo. In that document a resonant frequency of the liquid in a tank is estimated as a function of the tank and of its filling level. During transportation a frequency of movement of the ship is evaluated as a function of the climatic and sea conditions and the speed of the ship. Forecast movement frequencies are also evaluated on the route that the ship is to follow. If one of the movement frequencies comes too close to the resonant frequency of the liquid in a tank, an alarm is given to change route and/or to change the speed of the ship in order to avoid a hazardous situation.

Despite the provision of sloshing reduction measures, the sloshing of the liquids ins the tanks, in particular because of resonance phenomena, can lead to localized risks of deformation of the primary sealing primary membrane, damage to the underlying structures present in the primary and/or secondary spaces on which the primary sealing membrane rests, objects falling, in particular from static equipment, liable to damage the primary sealing membrane in the short to medium term, or more generally deformation of the primary sealing membrane beyond its structural tolerances. Tank inspections are provided in the preventive maintenance of the ships in order to verify the good state of the tank. However, a tank inspection necessitates complete draining of the tank, which immobilizes the ship, or renders the storage tanks of a floating unit unusable, for a certain period of time. On a ship having more than one tank, a majority, or even all of the tanks are classically inspected, which represents a very costly lack of activity. Now, in most cases the inspection may reveal no fault or no failing necessitating a repair, which also means that the inspection was superfluous and that the ship has been immobilized uselessly. In fact, the cost of immobilizing a tank, for example because of an inspection, impacts the cost-effectiveness of the ship; in other words a tank inspection induces a non-negligible risk of superfluous immobilization.

SUMMARY

An idea on which the invention is based is to determine a potential level of risk of damage to a tank of a ship as a function of what the tank has undergone during its service life, and this level of potential risk of damage to a tank is like a "wear index" representing the real ageing of the tank. To this end a liquid sloshing index is determined as a function of the movements of the ship while the latter is sailing between two points or stationary. This liquid sloshing index is stored and integrated over time to obtain the wear index of the tank. The wear index is then used to trigger a tank inspection and/or to determine among all the tanks of a ship the tank that is potentially the most damaged.

In accordance with a first embodiment, the invention provides a method for managing maintenance for a ship including at least one sealed and thermally insulating tank for transporting liquefied gas, the tank having a geometry and a position on the ship. The method comprises the steps consisting in:

determining a current filling level of the tank,
determining a current state of movement of the ship,
determining a current sloshing index from the current filling level of the tank and the current state of movement of the ship, taking into account the position and the geometry of the tank, integrating the determined current sloshing index into a wear index that takes into account a history of the sloshing indices, comparing the wear index to a first threshold in order to indicate if the tank needs to be inspected, depending on the result of the comparison.

Thanks to the use of the first threshold, it can be decided whether to carry out a tank inspection on the basis of an objective criterion representing the potential wear of the tank. The first threshold may be set in various ways. In accordance with one embodiment, the first threshold may be set in an absolute manner indicating a level of wear above which a tank must be inspected. In accordance with another embodiment, the first threshold is a relative value that indicates the tank that has suffered potentially greater wear than another tank.

The history of sloshing indices relates for example to a record of the current sloshing indices of the liquids from the commissioning of the ship or from the latest repair, partial or total, of the tank. Thus the current sloshing index of the liquids increments a wear index, available at all times, itself deriving from current sloshing indices previously measured/recorded.

In accordance with a preferred embodiment, the ship includes a plurality of tanks, a wear index is determined for each tank and the first threshold corresponds to a wear index of another tank in order to indicate that an inspection of the tank that has the highest wear index must be carried out.

In accordance with various embodiments, a method of the above kind may have one or more of the following features.

Once a tank is indicated as the one that has passed the first threshold, an inspection of the indicated tank may be carried out.

After inspection of the tank corresponding to the highest wear index, and if that inspected tank is damaged then there is determined the next tank that must be inspected as being the tank having the highest wear index of the remaining tanks. And so on, the inspection of the tanks being carried out in decreasing order of the wear indices until a tank inspection showing no failing necessitating a partial or total repair.

Thanks to the method, after the inspection of a tank, and if that tank is not damaged, then the inspection of the tanks may be halted.

The comparison of the wear index to a threshold is carried out during a maintenance operation on the ship.

In accordance with a variant, determining a current state of movement of the ship includes determining at least one of the following parameters: height of the waves, period of the waves, angle of attack of the waves relative to the orientation of the ship, speed of the ship, vibrations of the ship, measured movements of the ship.

By measured movements of the ship must be understood a measurement of one or more actual movements of the ship. In accordance with this variant, determining measured movements of the ship may include measuring acceleration in translation and in rotation about three mutually perpendicular axes.

In accordance with another variant, determining a current sloshing index takes into account at least one of the following additional structure state parameters: number of thermal cycles to which the tank has been subjected, elongation of the ship, level of stiffness of the hull, nature of the liquefied gas, level of filing of the ballast tanks.

Determining the current sloshing index preferably consists in determining a probability of deterioration of the tank when it is subjected to the current state of movement of the ship.

In accordance with one particular embodiment, the current sloshing index may be obtained by reading a value in a multiple entry correspondence table, an entry corresponding to the filling of the tank, at least one entry corresponding to the current state of movement of the ship and the read value representing a probability of deterioration of the tank.

In accordance with another embodiment, integrating the current sloshing index corresponds to a summation of current sloshing indices, the indices being calculated successively during successive measurement periods.

In accordance with a second embodiment, the invention also provides a system for managing maintenance for a ship including at least one sealed and thermally insulating tank for transporting liquefied gas. The system includes at least one tank filling level sensor, a device for evaluating movements of the ship, a processing means and a warning device. The at least one tank filling level sensor is adapted to measure a current level of filling of the at least one tank. The device for evaluating the movements of the ship is adapted to determine a current state of movement of the ship. The processing means is configured to determine a current sloshing index from the current level of filling of the tank and the current state of movement of the ship, taking into account the position and the geometry of the tank, to integrate the current sloshing index determined into a wear index that takes into account a history of the sloshing indices, and to compare the wear index to a first threshold. The warning device indicates if an inspection of the at least one tank or of each tank must be carried out as a function of the result of the comparison.

In accordance with one embodiment, the device for evaluating the movements of the ship includes a weather station that measures the height, the frequency and the direction of the waves in the environment of the ship.

In accordance with another embodiment, the device for evaluating the movements of the ship includes accelerometers placed in the ship.

In a preferred example, the processing means is in part located in a monitoring station on land and communicated for example by radio or other means of telecommunication with the ship to receive information relating to the current level of filling of the at least one tank and the current state of movement of the ship.

In another example the liquefied gas transport ship includes a plurality of sealed and thermally insulating tanks and a management system for each of its tanks.

BRIEF DESCRIPTION OF THE FIGURES

The invention will be better understood and other aims, details, features and advantages thereof will become more clearly apparent in the course of the following description of particular embodiments of the invention, provided by way of non-limiting illustration only, with reference to the appended drawings.

FIG. 1 is a schematic representation of a liquefied gas transport ship,

FIG. 2 represents a management system integrated into the ship from FIG. 1,

FIG. 3 represents a management system in accordance with another embodiment,

FIG. 4 is a flowchart representing a method for updating a wear index,

FIG. 5 is a flowchart representing a method for managing the maintenance of the tanks of a ship.

DESCRIPTION OF EMBODIMENTS

The embodiments are described hereinafter with reference to a ship including a double hull forming a support structure in which are arranged a plurality of sealed and thermally insulating tanks. In a support structure of this kind the tanks have for example a polyhedral geometry, for example of prismatic shape.

Sealed and thermally insulating tanks of this kind are provided for example for the transportation of liquefied gas. The liquefied gas is stored and transported in tanks of this kind at a low temperature which necessitates thermally insulating tank walls in order to maintain the liquefied gas at that temperature. It is therefore particularly important to maintain the integrity of the tank walls intact, including the thermal insulation spaces situated under the sealing membrane, on the one hand to preserve the seal of the tank and to prevent leaks of liquefied gas from the tanks and on the other hand to prevent the insulating characteristics of the tank from being degraded in order to maintain the gas in its liquefied form.

Sealed and thermally insulating tanks of this kind also include an insulating barrier anchored to the double hull of the ship and carrying at least one sealed membrane. By way of example, tanks of this kind may be produced using the technologies marketed under the trademarks Mark III® and NO96® of the applicant, or others.

FIG. 1 illustrates a ship 1 including four sealed and thermally insulating tanks 2. The four tanks 2 may have identical or different filling states. When it is at sea the ship 1 is subjected to numerous movements linked to the sailing conditions. These movements of the ship 1 are transmitted to the liquid contained in the tanks 3, 4, 5, 6 which is consequently subject to movements in the tanks 3, 4, 5, 6. These movements of the liquid in the tanks 3, 4, 5, 6 generate impacts on the walls of tanks 3, 4, 5, 6 that can damage the tanks immediately if they are too violent. Moreover, the repetitive hammering on the walls of the tanks 3, 4, 5, 6 at high but non-destructive levels can lead to deterioration of said walls through fatigue wear. Now it is important to preserve the integrity of the walls of tanks 3, 4, 5, 6 to preserve the seal and the insulating characteristics of the tanks 3, 4, 5, 6.

It is known to avoid critical sailing conditions to avoid liquid movements that risk immediate damage to the tank. Where damage linked to wear of the hammered materials is concerned, only regular tank inspections allow a damaged state to be detected. A tank inspection necessitates total draining of the tank in order to be able to enter the tank. This type of operation is relatively lengthy and immobilizes the ship for a long time. In order to optimize tank inspections the invention proposes to determine a tank wear index to decide the opportunity for an inspection of this kind.

The wear index of a ship tank must represent a risk of damage to the tank as a function of the impacts suffered that are linked to the sloshing of the liquefied gas cargo. The risk of damage to a ship's cryogenic tank can be expressed by the following formula:

$$\text{Risk} = \iint_{rank} \int_0^T \text{Prob}(\text{Pres}(dS,t) > \text{Res}(dS) | nr(t), mvt(t)) \, dS \, dt \quad [\text{Math 1}]$$

In which:
nr(t) represents a level of filling of the tank at a time t,
mvt(t) represents a movement of the tank at a time t, Pres(dS,t) represents the pressure exerted on a unit surface area dS of the tank at a time t, Res(dS) represents the strength of a unit surface area dS of the tank, Prob(Pres(dS,t)>Res(dS)|nr(t), mvt(t)) represents a probability of having a pressure on a unit surface area greater than its strength as a function of the level of filling of the tank and of the movement of the tank, T is the period over which the risk of damage is established.

A tank wear indicator can be produced by applying an approximation of the above formula to the actual life conditions of said tank. Accordingly, as a function of what the tank will have really suffered, the wear indicator will give a value representing a probability of damage.

FIG. 2 illustrates an example management system 100 onboard the ship 1. That management system 100 includes a central processor unit 110 connected to a plurality of onboard sensors 120 allowing different parameter measurements to be obtained. Thus the sensors 120 include, by way of non-exhaustive example, at least one filling level sensor 121 for each tank, various ship movement sensors 122 (tachometer, heading) and sea condition sensors 123. The management system 100 also includes a communication interface 130 enabling the central processor unit 110 to communicate with distant devices, for example to obtain meteorological data, ship position data, etc.

The number and the type of movement sensors 122 and sea condition sensors 123 depend on how the person skilled in the art chooses to determine the movement to which the ship is subjected and any measurement redundancies. In a preferred embodiment the sea condition sensor comprises a weather station that measures the height, the frequency and the direction of the waves in the environment of the ship. Alternatively, the sea conditions may not be measured and merely deduced from weather information as a function of the exact position of the ship. However, it is preferable to have some redundancy against failure of some sensors.

The management system 100 further includes a human-machine interface 140. That human-machine interface 140 includes a display means 41. That display means 41 enables the operator obtain the management information computed by the system or the measurements obtained by the sensors 120 or even a current sloshing state.

The human-machine interface 140 further includes an acquisition means 42 enabling the operator to feed the central processor unit 110 with magnitudes manually, typically to supply the central processor unit 110 with data that cannot be obtained by sensors because the ship does not include the necessary sensor or the latter is damaged. For example, in one embodiment, the acquisition means allows the operator to enter information on the height of the waves based on visual observation.

The management system 100 includes a database 150. That database 150 allows the measurements effected when sailing to be stored. In accordance with a preferred embodiment the database includes some magnitudes obtained in the laboratory or during onboard measurement campaigns at sea.

FIG. 3 illustrates an example of a management system 200 situated on land and communicating with the ship 1. The ship includes the central processor unit 110, the sensors 120 and a communication interface 130. The management system 200 includes a central processor unit 210, a communication interface 230, a human-machine interface 240 and a database 250. The functioning of the management system 200 is similar to the functioning of the management system 100 and differs only in the sending of information measured by the sensors 120 of the ship 1 to the management system 200 situated on land via the communication interfaces 130 and 230. By way of example, the communication interfaces may use terrestrial or satellite radio data transmission.

An example of updating a wear index is illustrated in the FIG. 4 flowchart. In accordance with a first embodiment, this update is effected entirely in the central processor unit 110 forming a single processing means. In accordance with a second embodiment this updating is carried out in part in the central processor unit 110 and in part in the central processor unit 210, the combination forming a shared processing means. During a first step 310 the tank filling level sensor 121 of each tank 3, 4, 5, 6 of the ship measures the level of liquid in each tank to determine the current filling level of each tank i. Then, during a second step 320, the movement sensors 122 and the sea condition sensors 123 send information to the central processor unit 110 to determine a current state of movement of the ship.

In order to simplify the calculations it is preferable to carry out measurements over a unit time interval during which the measurements are considered stationary. By way of example, a unit duration of one hour is suitable. Thus the current filling level measurements may be average measurements over one hour that allow movements of the liquid to be ignored to effect the measurement. Where the current state of movement of the ship is concerned, it is possible to consider either an average measurement or the worst case measurement over the unit duration. For example, if over the unit duration the sea condition sensors measure waves of 2 meters and waves of 8 meters, the measurement retained will correspond to waves of 8 meters. On the other hand, where the frequency of the waves is concerned, an average measurement may be suitable.

Once the measurements have been effected, a current sloshing index IBi is calculated for each tank during a step 330. The current sloshing index IBi may be determined in various ways as a function of the various measurements carried out of the filling level of the tank and of the current state of movement of the ship, taking into account the position and the geometry of the tank.

By way of example, a simplified first embodiment takes no account of the average filling level of a tank and the maximum height of the waves over one hour. In accordance with this first embodiment a correspondence table contained in the database 150 or 250 is used to determine the corresponding sloshing index IBi with the aid of a simple reading in the table as a function of the measurements carried out. The correspondence table may be produced during a measurement campaign on a tank having a similar geometric profile and on which the number and the force of the impacts of liquid on the walls of the tank have been measured. The result of these measurements is then placed in a correspondence table such as the table 1 below:

TABLE 1

|  |  | Wave height (m) | | | | |
| --- | --- | --- | --- | --- | --- | --- |
|  |  | 0-4 | 4-8 | 8-12 | 12-16 | 16+ |
| Tank filling level (%) | 0-5 | 1 | 2 | 3 | 4 | 5 |
|  | 5-15 | 3 | 6 | 9 | 12 | 15 |
|  | 15-30 | 2 | 4 | 6 | 8 | 10 |
|  | 30-70 | 0 | 0 | 0 | 0 | 0 |
|  | 70-85 | 1 | 2 | 3 | 4 | 5 |
|  | 85-95 | 2 | 4 | 6 | 8 | 10 |
|  | 95-99 | 1 | 2 | 3 | 4 | 5 |

As a function of the filling level and as a function of the wave height, the value of the current sloshing index IB is read off directly that takes into account the geometry of the tank. Obviously, the larger the table, the more precise the current sloshing index IB. Moreover, a table must correspond to each tank of the ship because the sloshing of the liquid depends, inter alia, on the shape of the tank and its position in the ship.

Using a single movement parameter, such as the height of the waves, is not sufficient to allow precise determination of the effect of sloshing and allows only a coarse indication to be obtained. In fact, it is possible to use many other parameters to determine the liquid sloshing such as the frequency of the waves, the angle of incidence of the waves on the ship, the speed of forward motion of the ship. Moreover, secondary parameters may also be added such as the force and the direction of the wind and of the currents. Using a correspondence table with a greater number of entries may be envisaged. It is equally possible to process the data before using them in the table. For example, the frequency of the waves, the angle of attack of the waves and the speed of the ship may be combined in a wave frequency acting on the ship and therefore allowing these three parameters to be reduced to a single one and therefore the size of the table to be reduced whilst taking into account a number of parameters. Another possibility is to determine a plurality of tables each of which gives a partial sloshing index and grouping those indices together, for example by multiplication of the partial indices.

Using a table further allows taking into account indirect causes of movement such as the vibrations of the ship, of the barge or simply of the tank, said vibrations being generated for example by the propulsion system or by the blades of the propellers of the ship. The amplitude and the frequency of the vibrations can be two entries in a table obtained by trial and error on a tank of similar size.

Another possibility consists in carrying out an actual measurement of the agitation of the ship by abstracting the state of the sea. The sensors 120 determine measured movements of the ship, for example by measuring the accelerations to which the ship is subjected on three perpendicular axes in translation and in rotation. To assess the movements of the ship an inertial measuring unit (IMU) could advantageously be used that consists of one or more accelerometers and/or one or more gyroscopes, for example mechanical gyroscopes, and/or one or more magnetometers. On the assumption that a plurality thereof are used (of the same type or of two different types), these measuring units are advantageously distributed over the ship in such a manner as to record a precise measurement of movement of the ship. It will be noted that an IMU is sometimes referred to as an MRU (Motion Reference Unit). There again, a correspondence table may be used, the table having an entry for each of the measurements.

Alternatively, it is equally possible to calculate an index representing the agitation of the liquid in the tank in a different manner. For example, the resonant frequency of the liquid in the tank is calculated as a function of the liquid level and the geometry of the tank. An average oscillation frequency of the ship is then determined for example by measuring the average frequency and the average amplitude of oscillation of the ship using accelerometers. A current sloshing index IBi can be proportional to the amplitude of oscillation of the ship and inversely proportional to the difference between the resonant frequency of the tank and the oscillation frequency of the ship.

To determine the instantaneous sloshing index it is equally possible to take into account additional structure state parameters that may have an influence on the risk of damage to the tank. The tank suffers large thermal variations that have the effect of lengthening and shortening the tank. The thermal cycles to which the tank is subjected also have a wear effect that weakens it. A multiplier coefficient of the instantaneous sloshing index can take into account the number of thermal cycles, thereby indicating the increased risk of damage linked to sloshing as a function of the number of thermal cycles. The thermal cycles may equally be weighted as a function of the liquid content of the tank the temperature of which can vary and thereby cause the amplitude of the thermal cycle to vary.

Another additional parameter concerns the elongation of the ship, in other words the variation of the length of the floating structure. The ship being made of metal, variations of length occur as a function of the temperature of the sea and of the sun. These variations of length are independent of the expansion of the membranes of the tank that is linked to the temperature of the liquefied gas. These expansion differences lead to supplementary stresses at the level of the membranes that can weaken the membranes to a greater or lesser degree. There again, introducing a multiplying factor can take these phenomena into account, for example by weighting by 10% the instantaneous sloshing index if the stresses caused by the elongation are beyond a predetermined threshold.

The level of stiffness of the hull or the flexibility of the hull can equally be taken into account, in particular when the tank or tanks is or are installed in a mobile ship. When the ship is subject to waves, it will twist to a greater or lesser degree as a function of its position relative to the wave. The deformation generated leads to stresses on the tanks that have to be taken into account in determining the instantaneous sloshing index.

The nature of the transported cryogenic liquid can influence the determination of the instantaneous sloshing index. The composition of the liquefied gas causes its density and its fluidity to vary, thereby changing the effects linked to sloshing in a positive or negative manner or simply changing the resonant frequency of the liquid in the tank. If the tank is intended for more than one type of gas an additional parameter specific to the nature of the cryogenic liquid transported must be taken into account for the determination of the instantaneous sloshing index.

The height of the liquid column in the ballast tanks is another additional parameter that can be taken into account in calculating the instantaneous sloshing index. In some ships the ballast tanks may be in direct contact with the wall that supports the tank. The sea water in the ballast tanks is also subject to sloshing. However, as a function of the filling of the ballast tanks the sloshing phenomena in the tank and in the ballast tanks may be amplified or damped. Only the structure of the ship enables the resulting effects to be determined.

Once the current sloshing index IBi has been determined for each tank of the ship for the unit duration, it is necessary to integrate it into a tank wear index IUi during a step 340. The sloshing index being calculated over a given unit period, merely updating by summation of the current sloshing index IBi in the wear index IUi previously calculated is sufficient to determine a wear index IUi that takes into account the history of the sloshing indices, for example since the commissioning of the ship.

The sloshing index IBi and the wear index IUi are not unitary because they concern a probability of damage. Moreover the magnitude of these indices IBi and IUi depends on the calculation accuracy that it is wished to obtain. Experienced persons will even be able to determine which is the magnitude to use with these indices. For example, with a current sloshing index IBi determined over an hour that might be between 0 and 15, the cumulative wear index IUi over a 30 year service life of the ship is between 0 and 4 million inclusive.

In accordance with a second embodiment the flowchart in FIG. 4 is partly executed on the land management system 200 that communicates with the ship. In accordance with this second embodiment, the ship 1 transmits to the land station all the information coming from the sensors 120. Alternatively, the sloshing indices IBi are calculated and stored in the ship during the voyage and the wear index IUi is calculated only when the ship arrives in port after transmitting the sloshing indices IBi calculated throughout the duration of the voyage effected by the ship.

The wear index IUi being calculated, it is used by the maintenance management system by means of the FIG. 5 flowchart which is an example used upon arrival at the correct port. This flowchart includes steps carried out by the maintenance personnel and others that are executed by the management system 100 or 200. Depending on the level of automation of maintenance, some steps could be carried out either by the maintenance personnel or executed by the system. A step 410 recovers the wear indices IUi of all the tanks of the ship. A first test 420 is carried out to determine if a tank inspection has to be envisaged given the current date and the number of days at sea effected by the ship.

If no inspection is scheduled, a test 430 compares the wear indices IUi to an inspection threshold SV corresponding to a high risk of damage that should not normally be reached before an inspection date. If the inspection threshold SV is reached by one or more wear indices IUi it is necessary to indicate that a tank inspection must be carried out for each of the tanks that has reached the threshold SV, for example by activating a visual or sound alarm during a step 440. Thus the crew is alerted to the fact that it is necessary to effect a tank inspection on arrival at the port for the tank or tanks concerned. If the threshold SV is not exceeded, or after the step 440 has been carried out, the flowchart ends.

If the test 420 determines that a tank inspection is scheduled then a step 450 enables the tank that has the highest wear index to be determined. To this end each wear index IUi is compared with the wear indices IUi of all the other tanks in order to determine the tank that has the highest wear index Max(IUi).

Once the highest wear index Max(IUi) has been determined the management system flags the corresponding tank during a step 460 and an inspection is carried out only for that tank.

Following the inspection of the tank, a new test 470 is carried out to determine if another tank has to be inspected. This test 470 consists in verifying if the inspected tank is damaged or not. If the tank is not damaged it is not necessary to inspect the other tanks which, according to the wear indices IUi, have a lower risk of damage. If on the other hand the tank is damaged then it is necessary to carry out the step 480.

The step 480 amounts to removing the wear index corresponding to the damaged tank that has just been inspected from the wear indices of the ship before repeating the step 450 to determine the next tank that has to be inspected, which is the tank having the highest wear index of the remaining tanks. If that tank is itself damaged then the tanks continue to be inspected in decreasing order of the wear indices IUi.

If a tank inspection does not reveal any faults or any failing necessitating at least one repair then none of the other tanks need to be inspected. A method of this kind enables the number of tanks inspected to be significantly reduced. The number of tanks inspected is reduced to the number of damaged tanks plus 1, which makes it possible to avoid draining all the tanks.

As stated, the automation may be more or less intense. In accordance with a relatively low automation embodiment the management system 100 and 200 merely stores the wear indicators IUi and compares them to one another and to the inspection threshold SV. The management system then displays the wear indicators IUi in decreasing order with a visual (for example red/green) indicator that indicates if the threshold SV has been passed. In this configuration only the steps 410, 430 and 450 are executed by the management system 100 or 200 and the rest of the FIG. 5 flowchart is carried out by the maintenance personnel.

In accordance with a highly automated embodiment, only the inspections of steps 440 and 460 are carried out by the maintenance personnel, the result of the inspection being recorded in the system.

Alternatively, the step 460 can also compare the wear index Max(IUi) with a minimum wear threshold below which it is not necessary to carry out any tank inspection. This makes it possible to dispense with an unnecessary tank inspection.

Alternatively, the test 430 and the step 440 may be eliminated. In fact, the inspection threshold SV must be relatively high to avoid tank inspections on each voyage. If the threshold is very high, it may prove of no utility.

In accordance with another variant, it may also be considered that there is no need for the inspection dates and to the contrary consider that only the inspection threshold SV is used to trigger inspections. In this case the test 430 can indicate that a number of tanks have a wear index IUi above the threshold SV. In order to avoid inspecting a plurality of tanks the step 440 may be replaced by steps corresponding to the steps 450 and 480 so that only one tank is inspected if they are not damaged.

If the threshold SV is reached and no tank is damaged it is necessary to increase the threshold SV to a new value that is entered with the acquisition means 42.

If a tank inspection concludes that a tank is damaged, that tank must be repaired either immediately or during a subsequent stop in port but the tank will be considered out of service pending repair. A tank out of service may be ignored when executing the FIG. 5 flowchart.

As long as no repair is carried out on a tank, it is necessary to preserve a wear index representing the wear of the tank from the building of the ship. Once the tank is repaired it may be that the wear index is no longer representative of the state of wear of that tank and that it is necessary to modify that index. If the tank repair consists in rebuilding virtually all of the tank, the repaired tank may be considered new and thus it is necessary to reset its wear index IUi to zero by means of the acquisition means 42. If on the other hand a partial repair of the tank has been done and certain traces of wear considered minor have not led to repairs, the wear index may be reduced or remain the same. In particular, if the repair concerns a minimal area of the tank, the index remains unchanged.

Although the invention has been described in connection with a plurality of particular embodiments, it is obvious that it is in no way limited to them and that it encompasses all technical equivalents and combinations of the means described if the latter fall within the scope of the invention.

The use of the verb "to include" or to "comprise" and conjugate forms thereof does not exclude the presence of elements or steps other than those stated in a claim.

In the claims, any reference sign between parentheses should not be interpreted as a limitation of the claim.

The invention claimed is:

1. A method for managing ship maintenance, comprising the steps of:
providing a ship including a plurality of sealed and thermally insulating tanks for transporting liquefied gas, each tank having a geometry and a position on the ship;
the ship being a ship transporting natural gas, a methane tanker or an anchored storage ship,
providing a management system configured to communicate with the ship, the management system having a central processor unit and a plurality of sensors, the central processor unit being-in communication with the sensors of the ship;
for each tank of the plurality of tanks, executing instructions of the central processor unit of the management system, including:
determining a current filling level of liquefied gas in the tank,
determining a current state of movement of the ship,
determining a current sloshing index IBi from the current filling level of the tank and the current state of movement of the ship, taking into account the position and the geometry of the tank, wherein the current sloshing index IBi is obtained by reading a value in a multiple entry correspondence table, an entry corresponding to the filling of the tank, at least one entry corresponding to the current state of movement of the ship and the read value representing a probability of deterioration of the tank when it is subjected to the current state of movement of the ship,
integrating the determined current sloshing index IBi into a wear index IUi representing a probability of damage to the tank that takes into account a history of sloshing indices, and
determining that a tank of the plurality of tanks needs to be inspected by determining comparing the wear index of the tank reaches a threshold; in which the threshold corresponds to a wear index of another tank in order to indicate that an inspection of the tank that has the highest wear index (Max (IUi)) must be carried out,
the method further comprising:
carrying out inspection of the tank that has the highest wear index (Max (IUi)), wherein the inspection of the tank comprises carrying out complete draining of the tank,
wherein, after inspection of the tank that has the highest wear index (Max (IUi)), and if the tank is damaged then determining a next tank that must be inspected as being the tank having the highest wear index of remaining tanks,
wherein, after inspection of the tank that has the highest wear index (Max (IUi)), and if the tank is not damaged, then determining that none of the remaining tanks must be inspected and draining none of the remaining tanks.

2. The method as claimed in claim 1, wherein the comparison of the wear index (IUi) to the threshold is carried out during a maintenance operation on the ship.

3. The method as claimed in claim 1, wherein determining a current state of movement of the ship includes determining at least one of the following parameters:
- height of the waves,
- period of the waves,
- angle of attack of the waves relative to the orientation of the ship,
- speed of the ship,
- vibrations of the ship,
- measured movements of the ship.

4. The method as claimed in claim 1, wherein determining a current sloshing index (IBi) takes into account at least one of the following additional structure state parameters:
- number of thermal cycles to which the tank has been subjected,
- elongation of the ship,
- level of stiffness of the hull,
- nature of the liquefied gas,
- level of filing of the ballast tanks.

5. The method as claimed in claim 1, wherein integrating the current sloshing index (IBi) corresponds to a summation of current sloshing indices, the current sloshing indices being calculated successively during successive measurement periods.

6. A method for managing ship maintenance, comprising the steps of:
- providing a ship including a plurality of sealed and thermally insulating tanks for transporting liquefied gas, each tank having a geometry and a position on the ship;
- the ship being a ship transporting natural gas, a methane tanker or an anchored storage ship,
- providing a management system configured to communicate with the ship, the management system having a central processor unit and a plurality of sensors, the central processor unit being-in communication with the sensors of the ship;
- for each tank of the plurality of tanks, executing instructions of the central processor unit of the management system, including:
  - determining a current filling level of liquefied gas in the tank,
  - determining a current state of movement of the ship,
  - determining a current sloshing index IBi from the current filling level of the tank and the current state of movement of the ship, taking into account the position and the geometry of the tank, wherein the current sloshing index IBi is obtained by reading a value in a multiple entry correspondence table, an entry corresponding to the filling of the tank, at least one entry corresponding to the current state of movement of the ship and the read value representing a probability of deterioration of the tank when it is subjected to the current state of movement of the ship,
  - integrating the determined current sloshing index IBi into a wear index IUi representing a probability of damage to the tank that takes into account a history of sloshing indices, and
  - determining that a tank of the plurality of tank needs to be inspected by determining the wear index of the tank reaches a threshold; in which the threshold corresponds to a wear index of another tank in order to indicate that an inspection of the tank that has the highest wear index (Max (IUi)) must be carried out, the method further comprising:
- carrying out inspection of the tank that has the highest wear index (Max (IUi)),
- concluding that the tank has the highest wear index (Max (IUi)) is damaged, and
- repairing the tank that has the highest wear index (Max (IUi)).

7. The method as claimed in claim 6, wherein determining the wear index (IUi) to the threshold is carried out during a maintenance operation on the ship.

8. The method as claimed in claim 6, wherein determining a current state of movement of the ship includes determining at least one of the following parameters:
- height of the waves,
- period of the waves,
- angle of attack of the waves relative to the orientation of the ship,
- speed of the ship,
- vibrations of the ship,
- measured movements of the ship.

9. The method as claimed in claim 6, wherein determining a current sloshing index (IBi) takes into account at least one of the following additional structure state parameters:
- number of thermal cycles to which the tank has been subjected,
- elongation of the ship,
- level of stiffness of the hull,
- nature of the liquefied gas,
- level of filing of the ballast tanks.

10. The method as claimed in claim 6, wherein integrating the current sloshing index (IBi) corresponds to a summation of current sloshing indices, the current sloshing indices being calculated successively during successive measurement periods.

* * * * *